United States Patent
Ayaki

(10) Patent No.: US 8,295,680 B2
(45) Date of Patent: Oct. 23, 2012

(54) RECORDING AND REPRODUCING APPARATUS AND RECORDING AND REPRODUCING SYSTEM

(75) Inventor: Yasushi Ayaki, Osaka (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 12/999,755

(22) PCT Filed: Jun. 18, 2009

(86) PCT No.: PCT/JP2009/002779
§ 371 (c)(1),
(2), (4) Date: Dec. 17, 2010

(87) PCT Pub. No.: WO2009/153994
PCT Pub. Date: Dec. 23, 2009

(65) Prior Publication Data
US 2011/0091186 A1    Apr. 21, 2011

(30) Foreign Application Priority Data
Jun. 20, 2008    (JP) .................................. 2008-161331

(51) Int. Cl.
*H04N 9/80* (2006.01)
(52) U.S. Cl. ..................................................... 386/252
(58) Field of Classification Search ........................ None
See application file for complete search history.

(56) References Cited

U.S. PATENT DOCUMENTS

| 6,526,510 B1 | 2/2003 | Kori et al. | |
| 6,694,023 B1 * | 2/2004 | Kim | 380/203 |
| 7,092,616 B2 * | 8/2006 | Unger | 386/254 |
| 7,502,470 B2 * | 3/2009 | Hanko et al. | 380/200 |
| 2006/0077825 A1 * | 4/2006 | Nonaka et al. | 369/47.12 |
| 2009/0259730 A1 * | 10/2009 | Machida et al. | 709/219 |

FOREIGN PATENT DOCUMENTS

| JP | 2000-339275 | 12/2000 |
| JP | 2003-223371 | 8/2003 |
| JP | 2003-273861 | 9/2003 |
| JP | 2007-318669 | 12/2007 |
| WO | 2007/034951 | 3/2007 |

OTHER PUBLICATIONS

International Search Report issued Sep. 29, 2009 in corresponding International Application No. PCT/JP2009/002779.

* cited by examiner

*Primary Examiner* — William C Vaughn, Jr.
*Assistant Examiner* — Gelek W Topgyal
(74) *Attorney, Agent, or Firm* — Wenderoth, Lind & Ponack, L.L.P.

(57) ABSTRACT

A recording and reproducing apparatus (1) includes: an AV recording medium (26) recording an AV data item; a transmitting and receiving unit (21) transmitting and receiving the item and information on the item to and from an other apparatus connected to the apparatus (1) via a network; a retrieving unit (28) retrieving AV data items that indicate a same program and are recorded on the AV recording medium and in the other apparatus; a comparing unit (29) comparing image qualities of the items; and a restriction value control unit (30) moving use restriction values through the transmitting and receiving unit so that, based on a result of the comparison, (i) a use restriction value of one of the items having a lower image quality is decreased by a predetermined value and (ii) a use restriction value of an other one of the items having a higher image quality is increased by the predetermined value.

11 Claims, 10 Drawing Sheets

RECORDING AND REPRODUCING APPARATUS AND RECORDING AND REPRODUCING SYSTEM

TECHNICAL FIELD

The present invention relates to a recording and reproducing apparatus and a recording and reproducing system for recording and reproducing an Audio and Visual (AV) data item with copy control information.

BACKGROUND ART

In recent years, home networks are being implemented in which AV appliances, such as a recording and reproducing apparatus, at home are connected to one another via a network so as to share various contents among the AV appliances.

Furthermore, in the case of handling data items required for copyright protection using the AV appliances, each of the AV appliances needs to be equipped with a processing means for protecting the copyright. The data items include recent movies, and fee-based TV programs and music. The most effective way to protect a copyright is to restrict the use of the data items required for copyright protection by encrypting the data items.

For example, as such a copyright protection protocol, Digital Transmission Contents Protection over Internet Protocol (DTCP-IP) has been put to practical use.

Under the DTCP-IP, 4 modes of copy control information have been defined which include "copy-free", "copy-one-generation", "no-more-copies", and "copy never". Based on the copy control information, copying of a content is restricted.

For example, when a recording and reproducing apparatus at home receives an AV data item of a program whose copy control information indicates "copy-one-generation" through broadcasting or distribution via the Internet and records the AV data item, the copy control information of the recorded AV data item is changed from the "copy-one-generation" to "no-more-copies" statuses. Thus, the AV data item recorded by the recording and reproducing apparatus is allowed for only its move. When the AV data item is recorded onto another recording and reproducing apparatus, the original AV data item is to be deleted. Thereby, copies of the AV data item cannot be created and used at home.

Meanwhile, the copyright protection protocols include a protocol in which the permitted number of copies of an AV data item is set as copy control information and whether or not copy is possible is managed based on the set number. In accordance with such a copyright protection protocol, with the permitted number of copies set as the upper limit, copies of the AV data item can be created and used (including the reproduction of the AV data item and creation of the additional copy) at home.

For example, PTL 1 discloses a technique regarding a digital content playback system that can appropriately copy or move a digital content whose permitted number of copies is restricted, between different devices.

With reference to FIG. 10, a conventional recording and reproducing apparatus will be described which can record a digital content whose permitted number of copies is restricted and create and use copies of the recorded digital content up to the permitted number of copies.

FIG. 10 conceptually illustrates that the conventional recording and reproducing apparatuses each of which can create and use the copies of an AV data item that is a digital content mutually transmit and receive the AV data item and information on each permitted number of copies by the apparatus, when they copy the AV data item via a home network.

In FIG. 10, recording and reproducing apparatuses 91 and 92 that are Hard Disk Drive (HDD) recorders and a recording and reproducing apparatus 93 that is a portable player are connected to one another via a home network 95.

Each of the apparatuses can copy an AV data item via the home network 95. Furthermore, each of the apparatuses has a function capable of converting a format of the AV data item when copying the AV data item.

Each of the recording and reproducing apparatuses 91 to 93 manages the permitted number of copies per AV data item. Each time it copies the AV data item, it subtracts 1 from a value indicating the permitted number of copies of the copied AV data item.

Furthermore, each of the recording and reproducing apparatuses 91 to 93 can move only their permitted number of copies of the AV data item held therein to another recording and reproducing apparatus.

In the example of FIG. 10, the permitted number of copies of a recorded program A held in the recording and reproducing apparatus 91 is "2" as a result of subtraction of "2" from "4". Furthermore, the recording and reproducing apparatus 92 adds "2" indicating the permitted number of copies subtracted by the recording and reproducing apparatus 91, to "0" of the permitted number of copies of the recorded program A that is held by the recording and reproducing apparatus 92. As a result, the permitted number of copies of the recorded program A that is held by the recording and reproducing apparatus 92 is "2".

Furthermore, when an apparatus to which an AV data item is copied (recording and reproducing apparatus) has a limitation in display capability and recording capability, generally, a format of the compression coding protocol is converted before the AV data item is copied.

[Citation List]
[Patent Literature]
[PTL 1] Japanese Unexamined Patent Application Publication No. 2007-318669

SUMMARY OF INVENTION

[Technical Problem]

Here, when an AV data item is copied, there are cases where the image quality of the AV data item is degraded from that of the copy source of the AV data item by converting the format. In other words, in a recording and reproducing system including recording and reproducing apparatuses connected to one another via a network, there are cases where AV data items that indicate the same program are present and have various image qualities.

In such a situation, when the user views or copies the program, that is, when the user uses the AV data item of the program, using the AV data item with a higher image quality is desired.

However, even when the AV data items that indicate the same program are present and their image qualities are different from one another in the recording and reproducing system, the recording and reproducing apparatuses included in the recording and reproducing system cannot effectively use the AV data items with higher image qualities.

The present invention has an object of providing a recording and reproducing apparatus and a recording and reproducing system that can effectively use an AV data item with a higher image quality, when AV data items that indicate the same program and have different image qualities are present.

[Solution to Problem]

In order to solve the problems, the recording and reproducing apparatus according to an aspect of the present invention is a recording and reproducing apparatus that records and reproduces an Audio and Visual (AV) data item with a use restriction value defined by a predetermined copyright protection protocol, the AV data item including at least one of video data and audio data that are included in a program, and the apparatus includes an AV recording medium on which the AV data item is recorded; a transmitting and receiving unit configured to transmit and receive the AV data item and information on the AV data item to and from an other apparatus connected to the recording and reproducing apparatus via a network; a retrieving unit configured to retrieve a plurality of AV data items that indicate a same program and are recorded on the AV recording medium and in the other apparatus; a comparing unit configured to compare image qualities of the AV data items retrieved by the retrieving unit; and a restriction value control unit configured to move use restriction values through the transmitting and receiving unit so that, based on a result of the comparison performed by the comparing unit, (i) a use restriction value of one of the AV data items that has a lower image quality is decreased by a predetermined value and (ii) a use restriction value of an other one of the AV data items that has a higher image quality is increased by the predetermined value.

Thereby, when a system including the recording and reproducing apparatus and the other apparatus according to an aspect of the present invention has the AV data items that indicate the same program and have different image qualities, the respective use restriction values are interchangeable according to the image qualities of the AV data items.

For example, a use restriction value of one of the AV data items that has a lower image quality can be diverted into a use restriction value of an AV data item with a higher image quality.

Thereby, the recording and reproducing apparatus according to an aspect of the present invention can effectively use the AV data item with the higher image quality.

Moreover, the recording and reproducing apparatus may further include: an attribute information recording medium on which the use restriction value of the AV data item recorded on the AV recording medium is recorded; and a managing unit configured to manage the use restriction value recorded on the attribute information recording medium, wherein the restriction value control unit is configured to move the use restriction values by controlling the managing unit and requesting the other apparatus so that (i) the use restriction value of one of the AV data items that has the lower image quality is decreased by the predetermined value and (ii) the use restriction value of the other one of the AV data items that has the higher image quality is increased by the predetermined value, the AV data items indicating the same program and including the AV data items recorded on the AV recording medium and in the other apparatus.

Moreover, a permitted number of copies of the AV data item recorded on the AV recording medium may be recorded on the attribute information recording medium as the use restriction value, and the restriction value control unit may be configured to request the other apparatus to subtract the predetermined value from a permitted number of copies of an AV data item recorded in the other apparatus that is one of the AV data items retrieved by the retrieving unit and to cause the managing unit to add the predetermined value to the permitted number of copies recorded on the attribute information recording medium, when the comparison by the comparing unit shows that an image quality of the AV data item recorded in the other apparatus is lower than an image quality of the AV data item recorded on the AV recording medium.

Moreover, a permitted number of copies of the AV data item recorded on the AV recording medium may be recorded on the attribute information recording medium as the use restriction value, and the restriction value control unit may be configured to cause the managing unit to subtract the predetermined value from the permitted number of copies recorded on the attribute information recording medium and to request the other apparatus to add the predetermined value to a permitted number of copies of an AV data item recorded in the other apparatus that is one of the AV data items retrieved by the retrieving unit, when the comparison by the comparing unit shows that an image quality of the AV data item recorded in the other apparatus is higher than an image quality of the AV data item recorded on the AV recording medium.

Thereby, the recording and reproducing apparatus according to an aspect of the present invention can interchange the permitted number of copies that is a use restriction value with the other apparatus. Thereby, even when the permitted number of copies of the AV data item with the higher image quality out of two AV data items that indicate the same program becomes "0", the AV data item with the higher image quality can be copied.

Moreover, the recording and reproducing apparatus is connectable, via the network, to a plurality of apparatuses including the other apparatus, the recording and reproducing apparatus may further include: an attribute information recording medium on which the use restriction value of the AV data item recorded on the AV recording medium is recorded; and a managing unit configured to manage the use restriction value recorded on the attribute information recording medium, the retrieving unit may be configured to retrieve the AV data items that indicate the same program, from among AV data items recorded in each of the apparatuses, the comparing unit may be configured to compare the image qualities of the AV data items retrieved by the retrieving unit to identify an AV data item with a highest image quality from among the AV data items, and the restriction value control unit may be configured to cause the managing unit to subtract the predetermined value from the use restriction value recorded on the attribute information recording medium and to request one of the apparatuses to add the predetermined value to a use restriction value of the AV data item with the highest image quality, the one of the apparatuses holding the AV data item with the highest image quality identified by the comparing unit.

Thereby, when an AV data item recorded in the recording and reproducing apparatus according to an aspect of the present invention is deleted, for example, the use restriction value of the AV data item to be deleted can be provided to the AV data item with the highest image quality from among the AV data items that are copies of the AV data item recorded in the recording and reproducing apparatus. In other words, the AV data item with the higher image quality can be effectively used.

Moreover, the recording and reproducing apparatus according to an aspect of the present invention may further include a reproducing unit configured to obtain and reproduce one of the AV data items determined as having a highest image quality, as a result of the comparison performed by the comparing unit.

Thereby, when the system including the recording and reproducing apparatus and the other apparatus according to an aspect of the present invention has the AV data items that indicate the same program and have different image qualities, the AV data item with the highest image quality can be selected and reproduced.

Moreover, the recording and reproducing apparatus is connectable, via the network, to a plurality of apparatuses including the other apparatus, and the recording and reproducing apparatus may further include: an attribute information recording medium on which an attribute value table is recorded, the attribute value table including an identification information item of one of the apparatuses on which an AV data item is recorded, and the AV data item being either a copy or a copy source of the AV data item recorded on the AV recording medium; and a transmission control unit configured, when the transmitting and receiving unit transmits the AV data item recorded on the AV recording medium, to read the identification information item from the attribute information recording medium and to cause the transmitting and receiving unit to transmit the identification information item to an other one of the apparatuses that is a destination of the AV data item.

Thereby, each of the recording and reproducing apparatus and the apparatuses according to an aspect of the present invention can effectively retrieve the copy or the copy source of the AV data item.

Moreover, the recording and reproducing apparatus according to an aspect of the present invention may further include: an attribute information recording medium on which an attribute value table is recorded, the attribute value table including (i) information indicating an image quality of the AV data item recorded on the AV recording medium and (ii) information indicating an image quality of an AV data item that is recorded in the other apparatus and is a copy of the AV data item recorded on the AV recording medium; and a managing unit configured to manage the attribute value table recorded on the attribute information recording medium, and to update the attribute value table using the information indicating the image quality of the AV data item that is recorded in the other apparatus, the information being received by the transmitting and receiving unit from the other apparatus, wherein the comparing unit may be configured to compare the image quality of the AV data item recorded on the AV recording medium with the image quality of the AV data item recorded in the other apparatus with reference to the attribute value table recorded on the attribute information recording medium.

Thereby, even when the image quality of the AV data item recorded in another apparatus is changed, the recording and reproducing apparatus according to an aspect of the present invention can reflect the change in the attribute value table held within.

Furthermore, since the comparing unit compares image qualities with reference to the attribute value table recorded in the attribute information recording medium, the comparison is performed effectively and accurately.

Furthermore, the recording and reproducing system according to an aspect of the present invention is implemented as a recording and reproducing system in which a plurality of recording and reproducing apparatuses is connected to each other via a network and which includes at least one recording and reproducing apparatus in the present invention.

Furthermore, the present invention may be implemented not only as a use restriction value control method using operations of the characteristic units in the recording and reproducing apparatus according to an aspect of the present invention as steps, but also as a program for causing a computer to execute the steps and as a recording medium on which the program is recorded. The program may be distributed via a transmission medium, such as the Internet and through a recording medium, such as a DVD.

[Advantageous Effects of Invention]

The recording and reproducing apparatus and the recording and reproducing system according to an aspect of the present invention can effectively use the AV data item with the higher image quality when AV data items that indicate the same program and have different image qualities are present.

(Further information about technical background to this application)

The disclosure of Japanese Patent Application No. 2008-161331 filed on Jun. 20, 2008 including specification, drawings and claims is incorporated herein by reference in its entirety.

DESCRIPTION OF EMBODIMENTS

Embodiments for implementing the present invention will be described with reference to the drawings.
(Embodiment 1)

Figure 1:
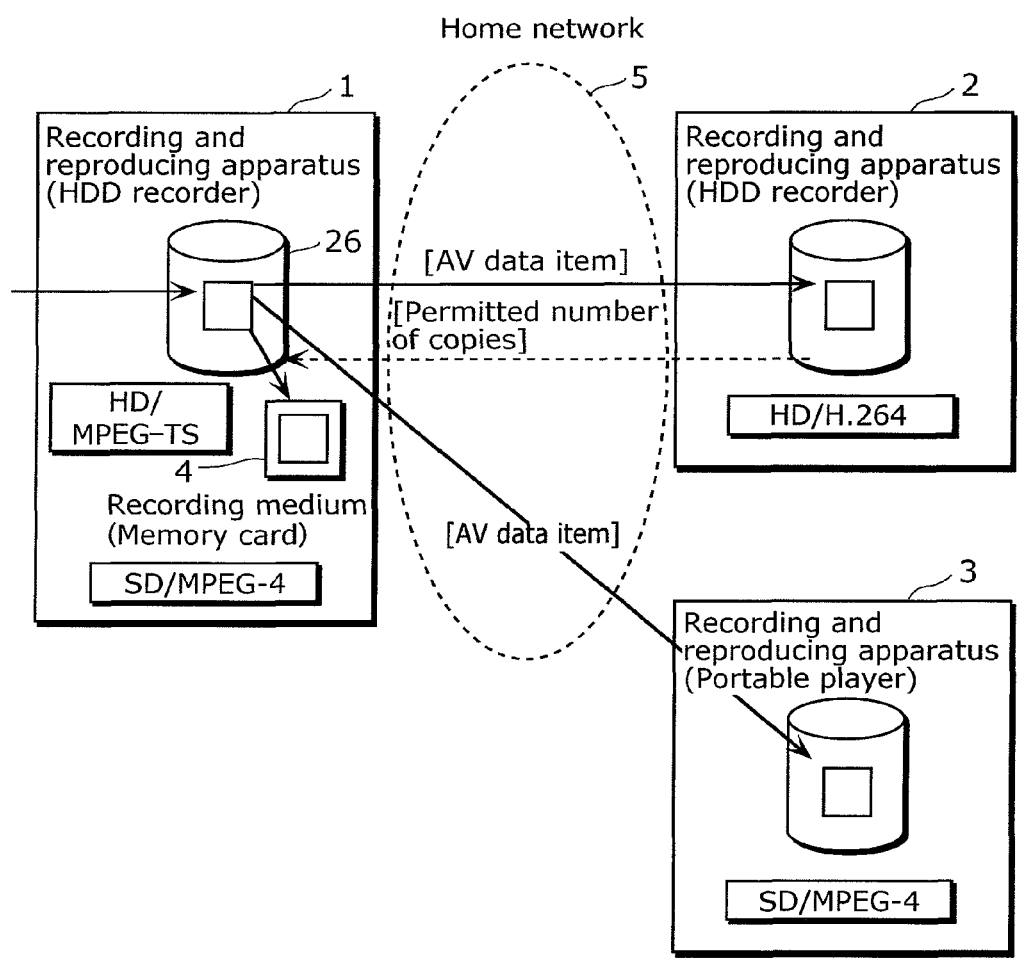
FIG. 1 is an outline drawing illustrating an example of moving the permitted number of copies in a recording and reproducing system according to Embodiment 1 in the present invention.

FIG. 1 is an outline drawing illustrating an example of moving the permitted number of copies in a recording and reproducing system according to Embodiment 1 in the present invention.

More specifically, FIG. 1 illustrates the data flow in the case where a recording and reproducing apparatus 1 retrieves AV data items that indicate the same program and are to be copied to recording and reproducing apparatuses 2 and 3 and a memory card 4, and the permitted number of copies is moved from the recording and reproducing apparatus 2 to the recording and reproducing apparatus 1.

Each of the recording and reproducing apparatuses 1 to 3 according to Embodiment 1 in the present invention is an apparatus that records and reproduces an Audio and Visual (AV) data item with a use restriction value defined by a predetermined copyright protection protocol. The AV data item includes at least one of video data and audio data that are included in a program.

More specifically, each of the recording and reproducing apparatuses 1 to 3 can record and reproduce the AV data item whose permitted number of copies that is one of the use restriction values (restriction values for restricting the use of the user) is defined.

As illustrated in FIG. 1, the recording and reproducing apparatuses 1 and 2 that are HDD recorders and the record reproduction apparatus 3 that is a portable player are connected to one another via a home network 5.

These three apparatuses can copy AV data items (digital contents) via the home network 5. Furthermore, each of these three apparatuses has a function of converting a format of an AV data item when copying the AV data item.

The recording and reproducing apparatus 1 includes a drive of the memory card 4 and a digital tuner (not illustrated). The recording and reproducing apparatus 1 can receive a program data item (AV data item) of a digital broadcast through the digital tuner, record the data item in an HDD 26, and copy the content recorded on the HDD 26 to the recording and reproducing apparatuses 2 and 3 via the home network 5.

The recording and reproducing apparatus 1 can further read and write, from and to the memory card 4, the AV data item recorded on the HDD 26 and an attribute information item of the AV data item.

Next, a method of managing copy information by each of the recording and reproducing apparatuses 1 to 3 will be described with reference to FIG. 2.

Figure 2:
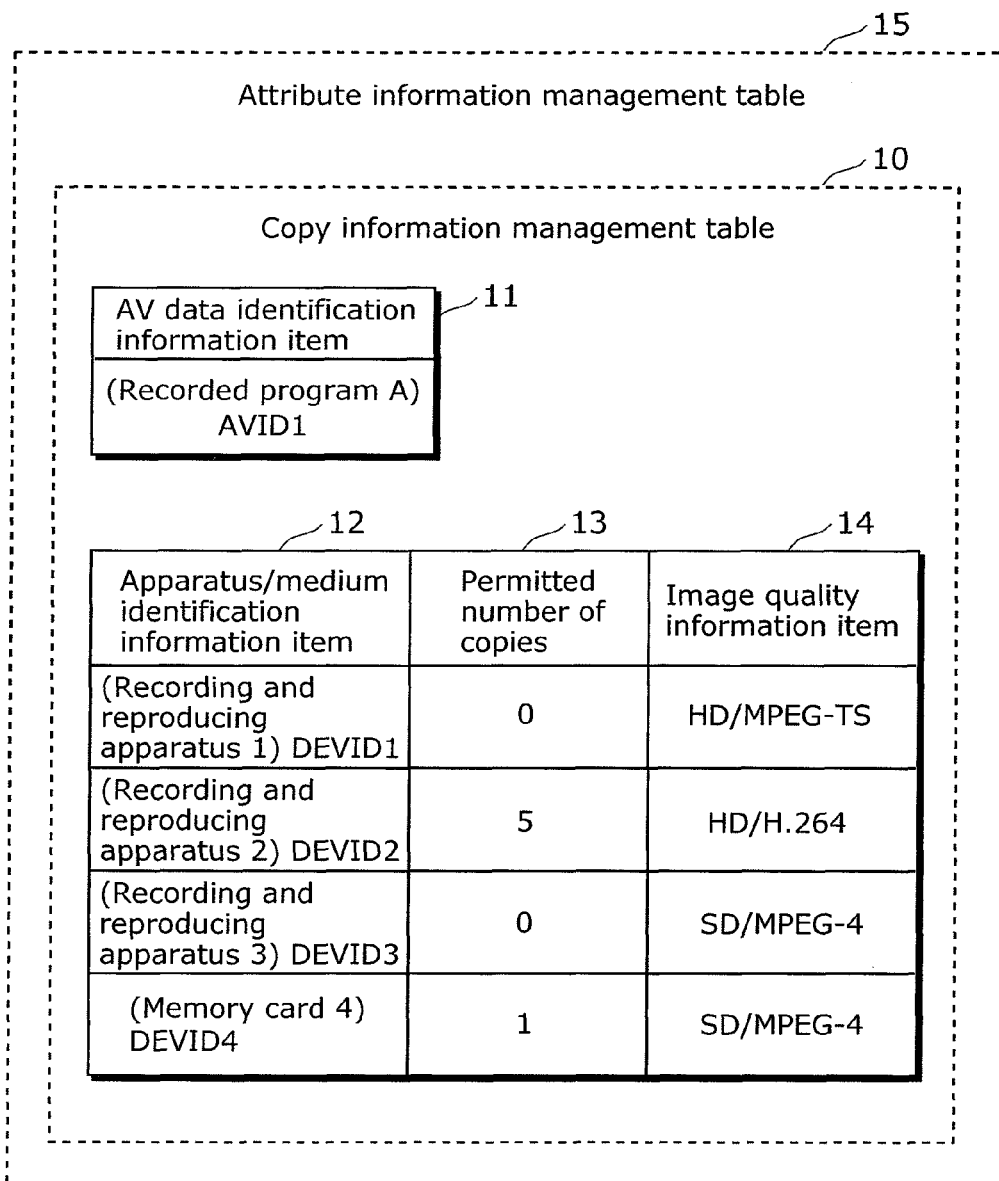
FIG. 2 illustrates an example of a data structure of a copy information management table according to Embodiment 1.

FIG. 2 illustrates an example of a data structure of a copy information management table 10 according to Embodiment 1.

More specifically, FIG. 2 illustrates the example of the data structure of the copy information management table 10 used by the recording and reproducing apparatus 1 for managing the permitted number of copies.

As illustrated in FIG. 2, the copy information management table 10 is managed as a part of an attribute information management table 15 for managing an attribute information item of an AV data item. The copy information management table 10 includes an AV data identification information item 11, an apparatus/medium identification information item 12, a permitted number of copies 13, and an image quality information item 14 as data items.

Furthermore, FIG. 2 illustrates an example of the copy information management table 10 regarding a "Recorded program A". What is stored in the copy information management table 10 is the AV data identification information item 11 corresponding to the "Recorded program A" (AVID1 in FIG. 2), the apparatus/medium identification information item 12 of a recording and reproducing apparatus or a recording medium to which the AV data item corresponding to the "Recorded program A" is copied (DEVID1 to DEVID4 in FIG. 2), the permitted number of copies 13 (0, 5, 0, 1 in FIG. 2), and the image quality information item 14 (HD/MPEG-TS, HD/H.264, for example in FIG. 2).

Here, "HD" (high definition) and "SD" (standard definition) indicating image definitions, and "MPEG-TS", "H.264", "MPEG-4", and others indicating image compression coding methods are stored as the image quality information item 14. "HD" is an abbreviation of high definition, and "SD" is an abbreviation of standard definition.

FIG. 2 indicates that the AV data item recorded in the recording and reproducing apparatus 1 (DEVID1) is an AV data item of a digital broadcast program received by the digital tuner and recorded on the HDD 26 included in the recording and reproducing apparatus 1.

Furthermore, when the "Recorded program A" that is the received and recorded digital broadcast program is, for example, a program in accordance with the "dubbing 10" system that is one of the copyright protection protocols, up to 9 times of copy is permitted at the end of the recording.

However, since the total 3 copies (3 times of copy) have already been created in the recording and reproducing apparatuses 2 and 3 and the memory card 4, the copy information management table 10 indicates that the total 6 times of copy including 5 times by the recording and reproducing apparatus 2 and 1 time by the memory card 4 can be executed as the remaining permitted number of copies of the "Recorded program A".

The reason why the recording and reproducing apparatus 2 has "5" as the permitted number of copies of the "Recorded program A" is because the permitted number of copies is moved from the recording and reproducing apparatus 1. The moving of the permitted number of copies between these apparatuses will be described later with reference to FIG. 4 and others.

Furthermore, the permitted number of copies "0" indicates the "no-more-copies" status. In other words, the number "0" indicates that the recording and reproducing apparatus 1 can only move the AV data item of the "program A".

Next, a configuration of the recording and reproducing apparatus 1 (same as those of the recording and reproducing apparatuses 2 and 3) will be described with reference to FIG. 3.

Figure 3:
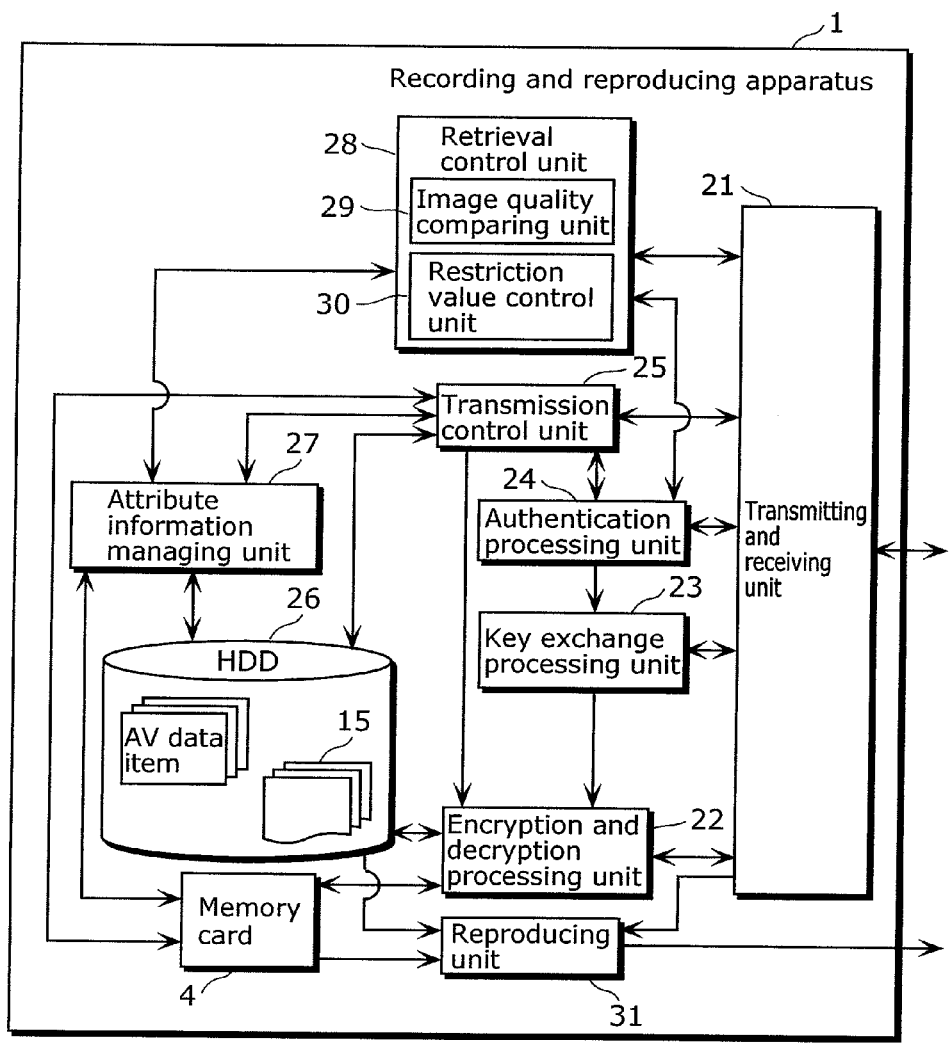
FIG. 3 is a block diagram illustrating a configuration of a recording and reproducing apparatus according to Embodiment 1 in the present invention.

FIG. 3 is a block diagram illustrating the configuration of the recording and reproducing apparatus 1 according to Embodiment 1 in the present invention.

As illustrated in FIG. 3, the recording and reproducing apparatus 1 according to Embodiment 1 includes a transmitting and receiving unit 21, an encryption and decryption processing unit 22, a key exchange processing unit 23, an authentication processing unit 24, a transmission control unit 25, the HDD 26, the memory card 4, an attribute information managing unit 27, a retrieval control unit 28, and a reproducing unit 31.

The process operations by the recording and reproducing apparatus 1 having such a configuration will be described hereinafter.

The transmitting and receiving unit 21 is a digital interface that transmits and receives an AV data item to and from another apparatus (for example, the recording and reproducing apparatus 2 or 3 in FIG. 1) via a network (for example, the home network 5 in FIG. 1). Furthermore, the transmitting and receiving unit 21 transmits and receives a command, an attribute information item of the AV data item, and others to and from other apparatuses connected to the network.

The encryption and decryption processing unit 22 encrypts the AV data item read from the HDD 26 or the memory card 4 when the transmitting and receiving unit 21 transmits the AV data item. The encryption and decryption processing unit 22 generates an encryption and decryption key (Kc) to be used for the encryption. using an exchanged key (Kx) fed from the key exchange processing unit 23, encryption mode information (E-EMI) generated based on copy control information fed from the attribute information managing unit 27, and a key update counter value (Nc).

The encryption and decryption processing unit 22 divides the encrypted AV data item into AV data packets, and transmits the AV data packets through the transmitting and receiving unit 21.

Furthermore, the encryption and decryption processing unit 22 decrypts the AV data item when the transmitting and receiving unit 21 receives the AV data item. The encryption and decryption processing unit 22 generates the encryption and decryption key (Kc) to be used for the decryption, using the exchanged key (Kx) fed from the key exchange processing unit 23, the encryption mode information (E-EMI) generated based on copy control information stored in a header of each of the AV data packets, and the key update counter value (Nc).

The AV data item decrypted by the encryption and decryption processing unit 22 is transmitted to and written into the HDD 26 or the memory card 4.

The key exchange processing unit 23 generates the exchanged key (Kx) to be used for encrypting the AV data item to be transmitted, when the transmitting and receiving unit 21 transmits the AV data item. The key exchange processing unit 23 further encrypts the generated exchanged key (Kx) using authentication key information (Kauth) received from the authentication processing unit 24, and provides the encrypted exchanged key (Kx) to the encryption and decryption processing unit 22.

Furthermore, the key exchange processing unit 23 decrypts the encrypted exchanged key provided through the transmitting and receiving unit 21, using the authentication key information (Kauth) received from the authentication processing unit 24. The key exchange processing unit 23 further provides the decrypted exchanged key (Kx) to the encryption and decryption processing unit 22.

The authentication processing unit 24 performs a mutual authentication process with a recording and reproducing apparatus to be authenticated through the transmitting and receiving unit 21. When the authentication has succeeded, the authentication processing unit 24 shares the authentication key information (Kauth) with the recording and reproducing apparatus to be authenticated.

The transmission control unit 25 is a control unit that controls each of the constituent elements in the recording and reproducing apparatus 1 to execute the transmitting and receiving process of an AV data item. When an AV data item of a program whose permitted number of copies is 0 is transmitted, after the completion of the transmission, the transmission control unit 25 deletes the transmitted AV data item. Furthermore, when the AV data item whose permitted number of copies is N where $N \geq 1$ is transmitted, the transmission control unit 25 controls the attribute information managing unit 27 to update the permitted number of copies of the AV data item of the HDD 26 to (N−1) times by subtracting 1.

Furthermore, in the transmitting and receiving process of an AV data item through the transmitting and receiving unit 21, the transmission control unit 25 transmits and receives the attribute information management table 15 (see FIG. 2) corresponding to the AV data item of the program to be transmitted and received. The transmission control unit 25 records the received attribute information management table 15 in the HDD 26 or the memory card 4 in association with the received AV data item of the program.

The AV data item of the program received from the digital tuner (not illustrated) and the attribute information management table 15 for managing the attribute information item of the AV data item are recorded in the HDD 26 or the memory card 4 in association with each other.

The AV data item read from the HDD 26 or the memory card 4 is provided to the encryption and decryption processing unit 22, and the attribute information item read from the HDD 26 or the memory card 4 is provided to the attribute information managing unit 27. Furthermore, the HDD 26 or the memory card 4 receives the attribute information item from the attribute information managing unit 27, and stores the information.

The attribute information managing unit 27 manages the attribute information management table 15 including the copy control information corresponding to each AV data item (program) and the copy information management table 10 in FIG. 2. The attribute information managing unit 27 is controlled by the transmission control unit 25 or the retrieval control unit 28, and performs read and write operations on the attribute information management table 15 with the HDD 26 or the memory card 4.

The attribute information management table 15 read from the HDD 26 or the memory card 4 is provided to the transmission control unit 25 or the retrieval control unit 28.

The retrieval control unit 28 is a control processing unit that controls each of the constituent elements in the recording and reproducing apparatus 1 and performs processes, such as retrieving an AV data item, comparing image qualities, and moving the permitted number of copies.

The process of comparing image qualities is executed by an image quality comparing unit included in the retrieval control unit 28. Furthermore, the process of moving the permitted number of copies is executed by a restriction value control unit 30 included in the retrieval control unit 28.

The retrieval control unit 28 retrieves, for example, AV data items that are recorded in other apparatuses including the HDD 26 and the memory card 4 and that indicate the same program.

More specifically, when the user specifies an AV data item of the program A recorded in the HDD 26, the retrieval control unit 28 executes the retrieval process with reference to the apparatus/medium identification information item 12 (see FIG. 2) of the AV data item of the program A registered in the attribute information management table 15.

The retrieval control unit 28 further determines whether or not the permitted number of copies can be moved with reference to the attribute information item of the AV data item of the program A recorded in the HDD 26 that has been retrieved in the retrieval process and attribute information item of the AV data item of the program A that is held by another apparatus.

The retrieval control unit 28 executes a process of moving the permitted number of copies from another apparatus according to a result of the determination. In the process of moving the permitted number of copies, the retrieval control unit 28 controls the attribute information managing unit 27 to add a predetermined value to a value of the permitted number of copies of the program A recorded in the HDD 26 or the memory card 4.

Furthermore, upon receipt of a request of retrieving the AV data item of the program A from another apparatus, the retrieval control unit 28 transmits the attribute information item of the program A recorded in the HDD 26 and the memory card 4, through the transmitting and receiving unit 21.

Furthermore, upon receipt of a request of moving the permitted number of copies from another apparatus, the retrieval control unit 28 performs the process of moving the permitted number of copies, and controls the attribute information managing unit 27 to subtract a predetermined value from the value of the permitted number of copies of the program A recorded in the HDD 26 or the memory card 4.

Next, the process of retrieving the AV data item of the program A and the process of moving the permitted number of copies will be described with reference to FIG. 4.

Figure 4:
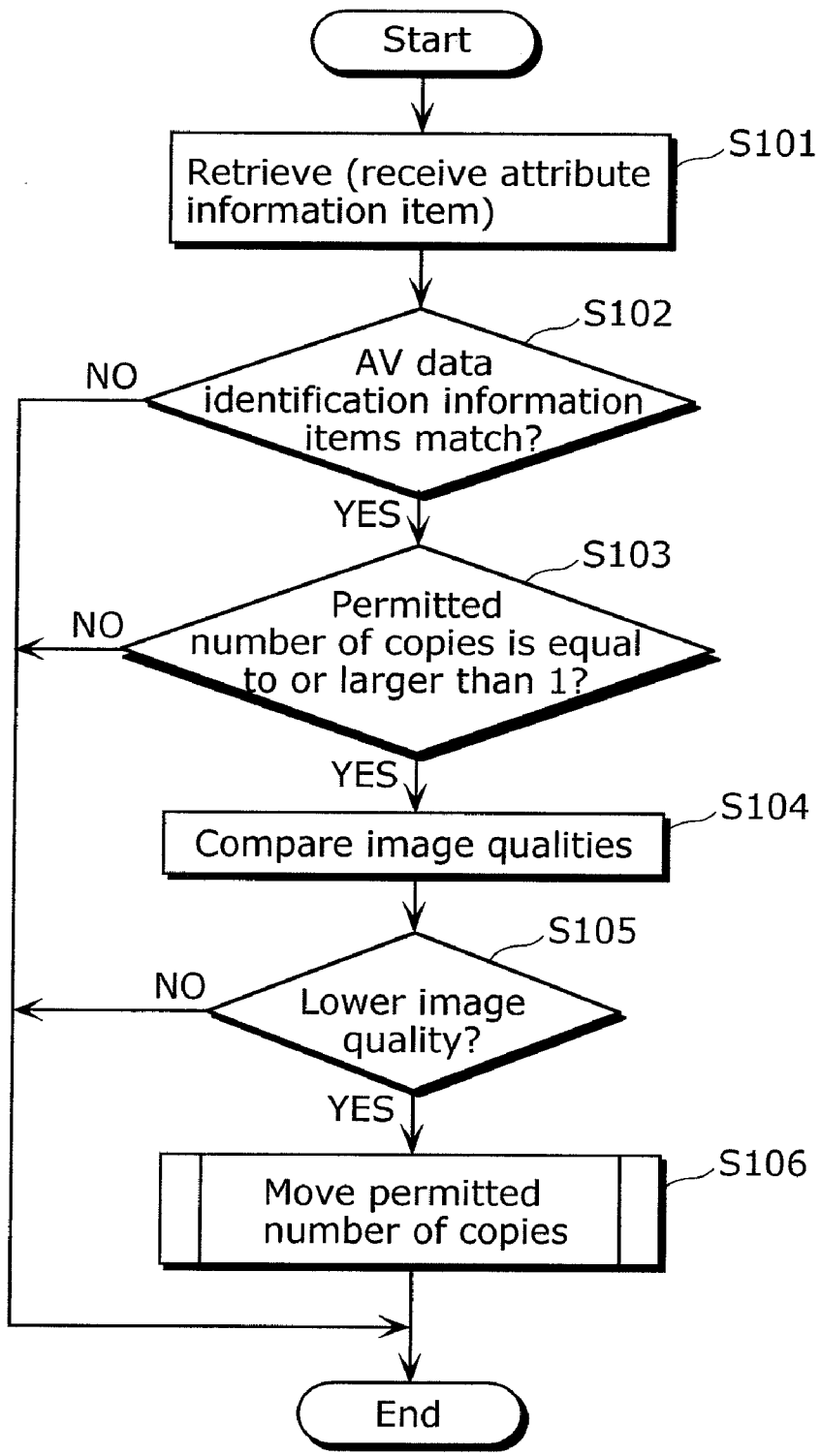
FIG. 4 is a flowchart showing processes of retrieving an AV data item and moving the permitted number of copies according to Embodiment 1.

FIG. 4 is a flowchart showing the processes of retrieving the AV data item and moving the permitted number of copies according to Embodiment 1.

The following describes the basic procedure by the recording and reproducing apparatus 1, for example, when the user instructs the recording and reproducing apparatus 1 to copy the program A recorded in the HDD 26. Furthermore, assumed is a case where the recording and reproducing apparatus 1 holds the permitted number of copies of the AV data item of the program A as "0", as illustrated in FIG. 2.

Furthermore, assumed is a case where the AV data item of the program A and the attribute information management table 15 are recorded in each of the HDD 26 and the memory card 4. Here, the HDD 26 and the memory card 4 are examples of an AV recording medium and an attribute information recording medium in the recording and reproducing apparatus according to the present invention.

First, the retrieval control unit 28 (see FIG. 3) receives the attribute information items corresponding to the AV data items of the instructed program A from the HDD 26, the memory card 4, and the recording and reproducing apparatuses 2 and 3 (S101). The retrieval control unit 28 further determines whether or not an identification information item of the AV data item of the program A recorded in the HDD 26 matches an identification information item of AV data item of the program A held by another apparatus (S102).

When the identification information item does not match the other (No at S102), the processing ends and a display that is not illustrated displays that the program A cannot be copied. Furthermore, when the identification information item matches the other (Yes at S102), the retrieval control unit 28 further verifies whether or not the permitted number of copies of the AV data item of the program A held by another apparatus is equal to or larger than 1 (S103).

When the permitted number of copies is not equal to or larger than 1 (No at S103), the processing ends and a display that is not illustrated displays that the program A cannot be copied.

When the permitted number of copies is equal to or larger than 1 (Yes at S103), the image quality comparing unit 29 compares the image quality of the AV data item of the program A that is recorded in the HDD 26, with the image quality of the AV data item of the program A held by another recording and reproducing apparatus, based on the image quality information items 14 of the copy information management table 10 (see FIG. 2) (S104).

Through the comparison process, the image quality comparing unit 29 determines whether or not the image quality of the AV data item of the program A held by another recording and reproducing apparatus is lower than the image quality of the AV data item of the program A that is recorded in the HDD 26 (S105).

When the image quality comparing unit 29 determines that the image quality of the AV data item of the program A held by another recording and reproducing apparatus is higher (No at S105), the processing ends. Here, for example, the display that is not illustrated displays that the program A can be copied by the recording and reproducing apparatus (2 or 3) that holds the AV data item.

Furthermore, when the image quality comparing unit 29 determines that the image quality of the AV data item of the program A held by another recording and reproducing apparatus is lower (Yes at S105), the restriction value control unit 30 moves the permitted number of copies from the other apparatus to itself (the recording and reproducing apparatus 1) (S106).

The following will describe a specific example. Assumed is a case where the image quality of the AV data item of the program A held by each of the memory card 4 and the recording and reproducing apparatuses 1 to 3 is the image quality shown in the copy information management table 10 in FIG. 2, that is, a case where the image quality information item of the AV data item of the program A stored in the recording and reproducing apparatus 2 is HD/H.264 and the image quality information item of the AV data item of the program A stored in the HDD 26 of the recording and reproducing apparatus 1 is HD/MPEG-TS.

Here, the image quality comparing unit 29 determines that the image quality of the AV data item of the program A stored in the recording and reproducing apparatus 2 is lower than the image quality of the AV data item of the program A stored in the HDD 26 of the recording and reproducing apparatus 1.

Based on a result of the comparison, the restriction value control unit 30 requests the recording and reproducing apparatus 2 to change the value of the permitted number of copies of the AV data item of the program A stored in the recording and reproducing apparatus 2 to "0" by subtracting "5" from "5". Furthermore, the restriction value control unit 30 controls the attribute information managing unit 27 so that the value of the permitted number of copies of the AV data item of the program A stored in the HDD 26 of the recording and reproducing apparatus 1 is changed to "5" by adding "5" to "0".

Here, the value of the permitted number of copies to be moved is not limited to "5". For example, it may be "1". In other words, as long as the value can be moved, it is not limited to a specific value.

Next, the detailed processes of moving the permitted number of copies (S106 in FIG. 4) will be described with reference to FIG. 5.

Figure 5:
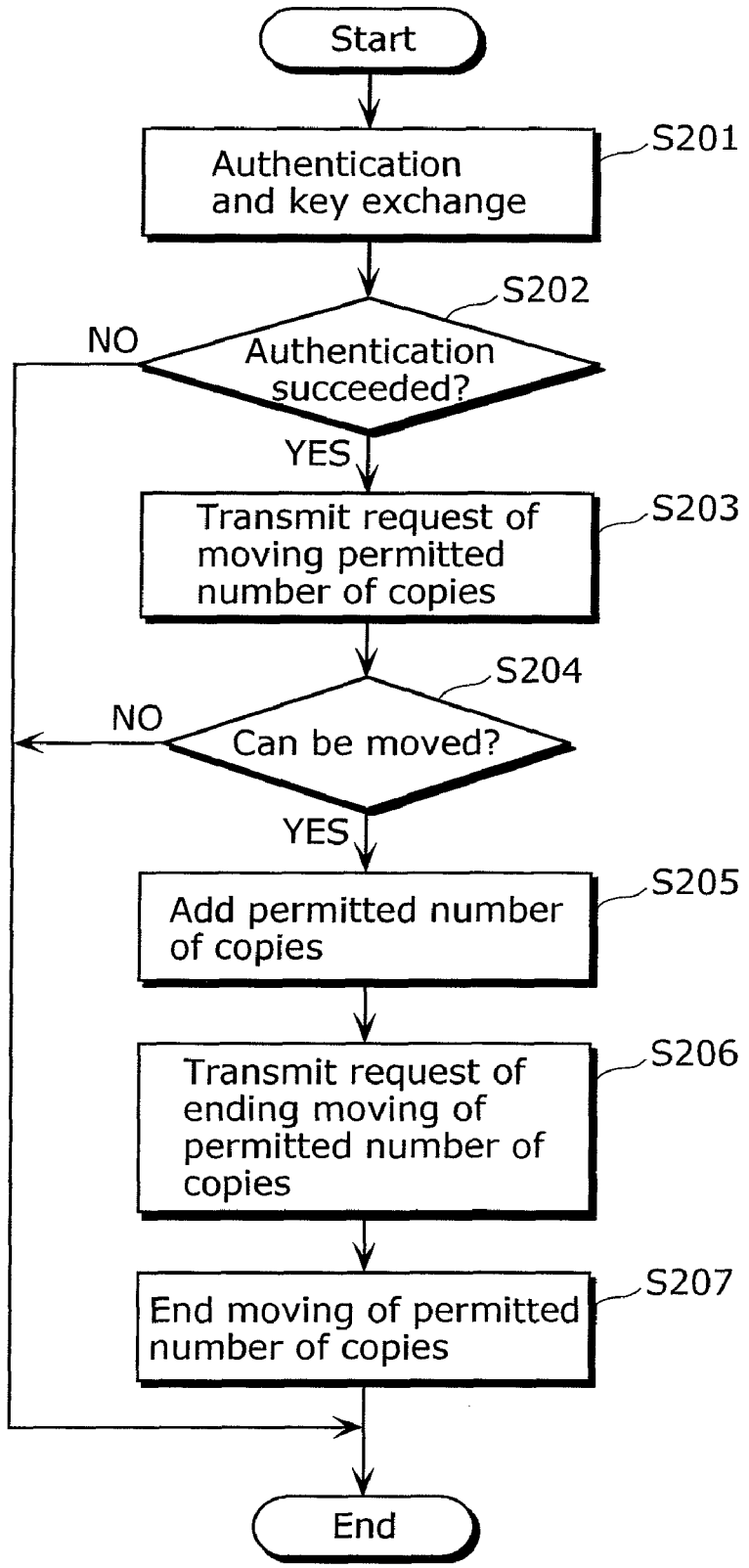
FIG. 5 is a flowchart showing detailed processes of moving the permitted number of copies according to Embodiment 1.

FIG. 5 is a flowchart showing the detailed processes of moving the permitted number of copies.

The authentication processing unit 24 (see FIG. 3) of the recording and reproducing apparatus 1 transmits an authentication start request to the recording and reproducing apparatus 2 that is a source of the permitted number of copies, and executes the authentication and key exchange process (S201). The authentication processing unit 24 further verifies whether or not the authentication has succeeded (S202).

When the authentication has failed (No at S202), the restriction value control unit 30 of the recording and reproducing apparatus 1 ends the processing. Furthermore, when the authentication has succeeded (Yes at S202), the restriction value control unit 30 transmits a request of moving the permitted number of copies to the recording and reproducing apparatus 2 through the transmitting and receiving unit 21 (S203), and verifies whether or not the permitted number of copies can be moved (S204).

When the recording and reproducing apparatus 2 does not accept the request (No at S204), the restriction value control unit 30 of the recording and reproducing apparatus 1 ends the processing. Furthermore, when the recording and reproducing apparatus 2 accepts the request (Yes at S204), the restriction value control unit 30 adds the permitted number of copies (S205). After the process of adding the permitted number of copies ends, the restriction value control unit 30 transmits a request of ending the moving of the permitted number of copies (S206) and ends the process of moving the permitted number of copies (S207).

Next, the communication between a source apparatus (the recording and reproducing apparatus 2) and a destination apparatus (the recording and reproducing apparatus 1) when the permitted number of copies is moved between these apparatuses will be described with reference to FIG. 6.

Figure 6:
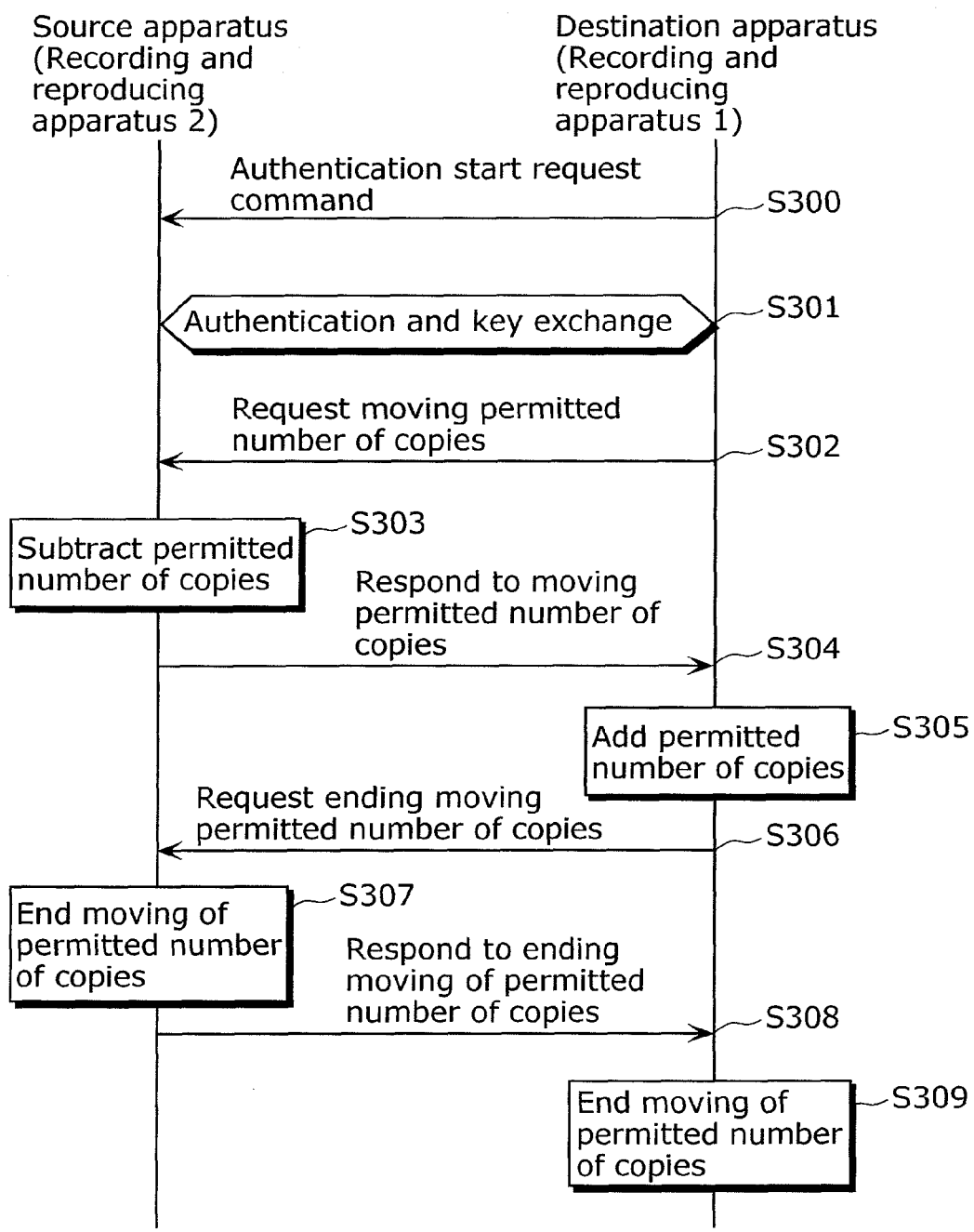
FIG. 6 illustrates a communication sequence between a source apparatus and a destination apparatus when the permitted number of copies is moved between these apparatuses according to Embodiment 1.

FIG. 6 illustrates a communication sequence between the source apparatus and the destination apparatus when the permitted number of copies is moved between these apparatuses.

First, the destination apparatus (recording and reproducing apparatus 1) transmits an authentication start request to the source apparatus (recording and reproducing apparatus 2) (S300), and executes the authentication and key exchange between the destination apparatus and the source apparatus (S301). Then, the destination apparatus transmits, to the source apparatus, a request of moving the permitted number of copies that is generated using the authentication key information (S302).

The source apparatus subtracts a value of the requested permitted number of copies of the AV data item of the program A, in response to the request of moving the permitted number of copies from the destination apparatus (S303). The source apparatus stores a result of the subtraction in a response of moving the permitted number of copies that is generated using the authentication key information, and transmits the response to the destination apparatus (S304).

The destination apparatus verifies, from the response of moving the permitted number of copies received from the source apparatus, that the source apparatus has subtracted the value of the requested permitted number of copies of the AV data item of the program A. After the verification, the destination apparatus adds the permitted number of copies of the AV data item of the program A held by the destination apparatus (S305), and transmits a request of ending the moving of the permitted number of copies to the source apparatus (S306).

The source apparatus ends the moving of the permitted number of copies in response to the request of ending the moving of the permitted number of copies from the destination apparatus (S307). Once the source apparatus executes the ending process, it transmits a response of ending the moving of the permitted number of copies to the destination apparatus (S308).

The destination apparatus ends the moving of the permitted number of copies upon receipt of the response of ending the moving of the permitted number of copies from the source apparatus (S309). Thereby, the process of moving the permitted number of copies ends.

As described above, the recording and reproducing apparatus 1 according to Embodiment 1 in the present invention includes the retrieval control unit 28 that retrieves AV data items that indicate the same program and are recorded in the HDD 26 and other apparatuses, and the image quality comparing unit 29 that compares the image qualities of the AV data items retrieved by the retrieval control unit 28.

Furthermore, the restriction value control unit 30 included in the recording and reproducing apparatus 1 moves the permitted number of copies of the AV data item of the program A, based on a result of the comparison performed by the image quality comparing unit 29. Thereby, the permitted number of copies can be moved by selecting an AV data item of the program A with a higher image quality to be preferentially used, from among AV data items of the program A with different image qualities.

Thus, the recording and reproducing apparatus 1 according to Embodiment 1 in the present invention can copy a certain AV data item effectively using the number of copies permitted to another AV data item.

In other words, the recording and reproducing apparatus 1 according to Embodiment 1 in the present invention can select one AV data item from among AV data items that indicate the same program, according to classifications of image qualities of the AV data items and an intended use, and can copy the selected AV data item.

Furthermore, when copying an AV data item of a program to another apparatus, the recording and reproducing apparatus 1 according to Embodiment 1 in the present invention transmits, together with the AV data item, the attribute information item including the identification information item of an apparatus and a recording medium to which the AV data item is to be copied other than the other apparatus, and copies the attribute information item to the other apparatus. Thus, the other apparatus can effectively retrieve the AV data item of the program.

Embodiment 1 in the present invention describes a function of moving the permitted number of copies of the recording and reproducing apparatus 1 by requesting another apparatus to subtract, based on the image quality information items, a value of the permitted number of copies of the AV data item of the program A recorded in the other apparatus by a predetermined value, and adding the predetermined value to the permitted number of copies of the AV data item of the program A recorded in the recording and reproducing apparatus 1.

However, the recording and reproducing apparatus 1 may move the permitted number of copies by subtracting a predetermined value from a value of the permitted number of copies of the AV data item of the program A recorded in the recording and reproducing apparatus 1 based on the image quality information items, and adding the predetermined value to the permitted number of copies of the AV data item of the program A that is recorded in the other apparatus. Furthermore, the permitted number of copies may be moved between other apparatuses based on the image quality information items.

Furthermore, the recording and reproducing apparatus 1 according to Embodiment 1 in the present invention moves a permitted number of copies of the AV data item of the program A based on the image quality information item. Here, the permitted number of copies is a use restriction value. The use restriction value to be moved is not limited to the permitted number of copies, and may be, for example, a reproducible number of times and a reproducible time period of an AV data item.

In other words, the "use restriction value defined by a predetermined copyright protection protocol" in Claims is not limited to the permitted number of copies, but indicates information of the use of an AV data item by the user that is defined by a predetermined copyright protection protocol, such as the reproducible number of times and the reproducible time period of an AV data item.

Furthermore, although two types of image quality information items, that is, "HD" (high definition) and "SD" (standard definition) are used as the image quality information items according to Embodiment 1 in the present invention, the image quality information items are not limited to these. For example, the total number of pixels, the horizontal number of pixels, the vertical number of pixels, a data rate, and others may be used as the image quality information items.

Furthermore, although Embodiment 1 in the present invention describes operations in the case where the use restriction values are moved between the recording and reproducing apparatuses, the present invention is not limited to the operations. For example, the use restriction values may be moved between the HDD 26 and the memory card 4 in the recording and reproducing apparatus 1.

Furthermore, the recording and reproducing apparatus 1 may, for example, move a permitted number of copies of the AV data item held in the recording and reproducing apparatus 1, for example, so that a part of or an entire of the permitted number of copies is provided to an AV data item with the highest image quality from among AV data items each indicating the copy or the copy source of the AV data item held in the recording and reproducing apparatus 1.

For example, when the AV data item of the program A recorded in the recording and reproducing apparatus 1 is deleted in response to an instruction from the user, in the case where the remaining permitted number of copies attached to the AV data item is equal to or larger than 1, the recording and reproducing apparatus 1 may move the permitted number of copies so that the remaining permitted number of copies is provided to the AV data item with the highest image quality from among the copies of the AV data item.

Figure 7:
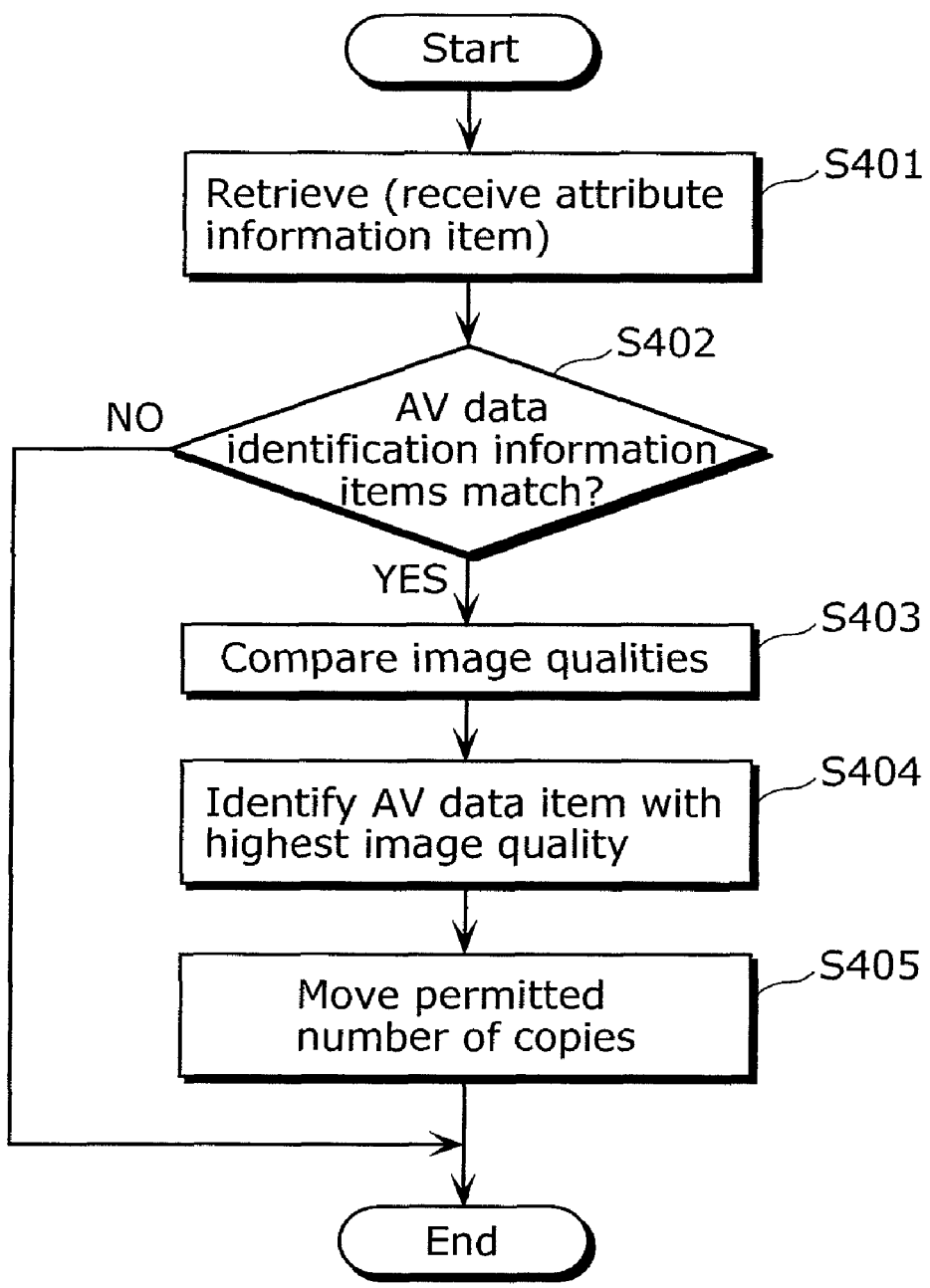
FIG. 7 is a flowchart showing an outline of the processes in which the recording and reproducing apparatus according to Embodiment 1 provides the remaining permitted number of copies to the AV data item with the highest image quality.

FIG. 7 is a flowchart showing an outline of the processes in which the recording and reproducing apparatus provides the remaining permitted number of copies to the AV data item with the highest image quality.

The following will be described under an assumption that the AV data item of the program A is recorded in the HDD 26 of the recording and reproducing apparatus 1 and that the permitted number of copies of the AV data item is "1".

For example, once the recording and reproducing apparatus 1 receives an instruction for deleting the AV data item of the program A recorded in the HDD 26, the retrieval control unit 28 receives the attribute information item corresponding to the AV data item of the program A from another apparatus (S401). The retrieval control unit 28 further determines whether or not an identification information item of the AV data item of the program A recorded in the HDD 26 matches an identification information item of the AV data item of the program A held by another apparatus (S402).

When these identification information items do not match each other (No at S402), the process is ended and the AV data item of the program A recorded in the HDD 26 is deleted.

Furthermore, the case where there are identification information items that match the AV data item of the program A recorded in the HDD 26 (Yes at S402) indicates that the AV data item of the program A is recorded in one or more of other apparatuses.

Here, the image quality comparing unit 29 identifies an AV data item with the highest image quality from among the AV data items by comparing the image qualities of the AV data items (S404).

For example, as illustrated in FIG. 2, when the AV data item of the program A is recorded in each of the recording and reproducing apparatuses 2 and 3 and the memory card 4, the AV data item of the program A recorded in the recording and reproducing apparatus 2 has the highest image quality.

The restriction value control unit 30 moves the permitted number of copies so that the "1" indicating the remaining permitted number of copies of the AV data item recorded in the HDD 26 is provided to the AV data item of the program A recorded in the recording and reproducing apparatus 2 that has been identified by the image quality comparing unit 29.

More specifically, the restriction value control unit 30 controls the attribute information managing unit 27 so that the permitted number of copies of the AV data item recorded in the HDD 26 is changed from "1" to "0". In other words, "1" is subtracted from the permitted number of copies of the AV data item recorded in the HDD 26.

Furthermore, the restriction value control unit 30 requests, through the transmitting and receiving unit 21, the recording and reproducing apparatus 2 to add "1" to the permitted number of copies of the AV data item recorded in the recording and reproducing apparatus 2.

Thereby, the permitted number of copies of the AV data item recorded in the recording and reproducing apparatus 2 is increased by "1".

Thereby, the use restriction value of the AV data item that is conventionally invalidated by deleting the AV data item of the program A from the HDD 26 is effectively used as the AV data item with the highest image quality from among the AV data items of the program A.

In the verification process on the identification information items (S402), when only one identification information item matches the identification information item of the AV data item of the program A recorded in the HDD 26, the permitted number of copies of the AV data item corresponding to the matching identification information item is moved (S405). In other words, the process of comparing image qualities (S403) and the process of identifying the AV data item with the highest image quality (S404) are not performed.

(Embodiment 2)

Figure 8:
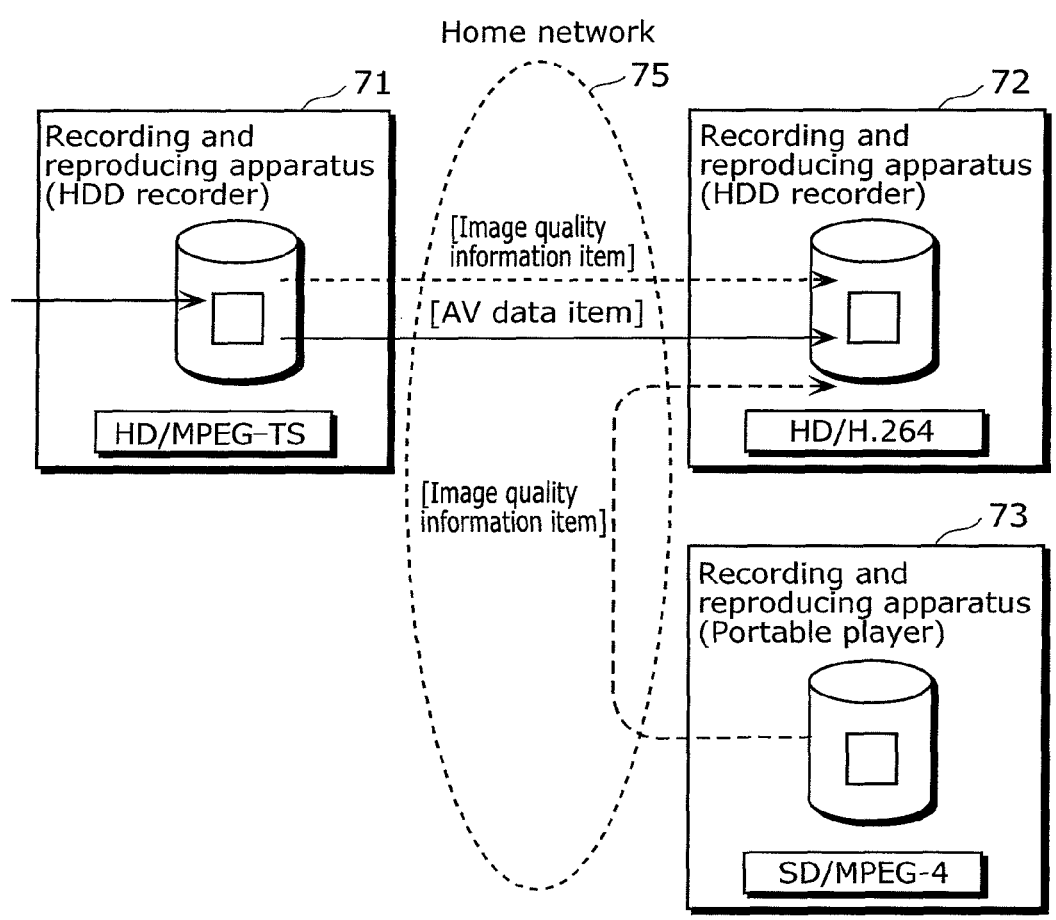
FIG. 8 is an outline drawing illustrating that a recording and reproducing apparatus according to Embodiment 2 in the present invention transmits and receives data when reproducing the AV data item selected based on the image quality information item.

The main configuration of each of the recording and reproducing apparatuses 71 to 73 in FIG. 8 according to Embodiment 2 in the present invention is the same as a corresponding one of the recording and reproducing apparatuses 1 to 3 in FIG. 3 according to Embodiment 1 in the present invention.

In other words, each of the recording and reproducing apparatuses 71 to 73 includes a transmitting and receiving unit 21, an encryption and decryption processing unit 22, a key exchange processing unit 23, an authentication processing unit 24, a transmission control unit 25, an HDD 26, an attribute information managing unit 27, a retrieval control unit 28, and a reproducing unit 31.

The difference between the recording and reproducing apparatus 71 according to Embodiment 2 and the recording and reproducing apparatus 1 according to Embodiment 1 is a function of selecting an AV data item from among the retrieved AV data items based on the respective image quality information items and reproducing the selected AV data item, after the retrieval control unit 28 retrieves AV data items of a program (supposedly, program B). The feature will be described hereinafter in detail.

FIG. 8 is an outline drawing illustrating that the recording and reproducing apparatus 71 according to Embodiment 2 in the present invention transmits and receives data on a network, when selecting an AV data item from among the AV data items that indicates the same program based on the respective image quality information items and reproducing the selected AV data item.

As illustrated in FIG. 8, the recording and reproducing apparatuses 71 and 72 that are HDD recorders and the record reproduction apparatus 73 that is a portable player are connected to one another via a home network 75.

Furthermore, FIG. 8 illustrates that the recording and reproducing apparatus 72 obtains an AV data item of the program B from the recording and reproducing apparatus 71 and reproduces the AV data item.

More specifically, when performing the process, the recording and reproducing apparatus 72 receives, from the recording and reproducing apparatuses 71 and 73, respective attribute information items of the AV data items of the program B that are recorded therein. Furthermore, the recording and reproducing apparatus 72 selects the AV data item (with the image quality information item of HD/MPEG-TS) of the program B that is recorded in the HDD 26 of the recording and reproducing apparatus 71 as the AV data item determined as having a higher image quality. The recording and reproducing apparatus 72 receives the selected AV data item of the program B from the recording and reproducing apparatus 71 via the home network 75, and reproduces the received AV data item.

Next, the retrieving, selecting, and reproducing processes by the recording and reproducing apparatus 72 according to Embodiment 2 in the present invention will be described with reference to FIG. 9.

Figure 9:
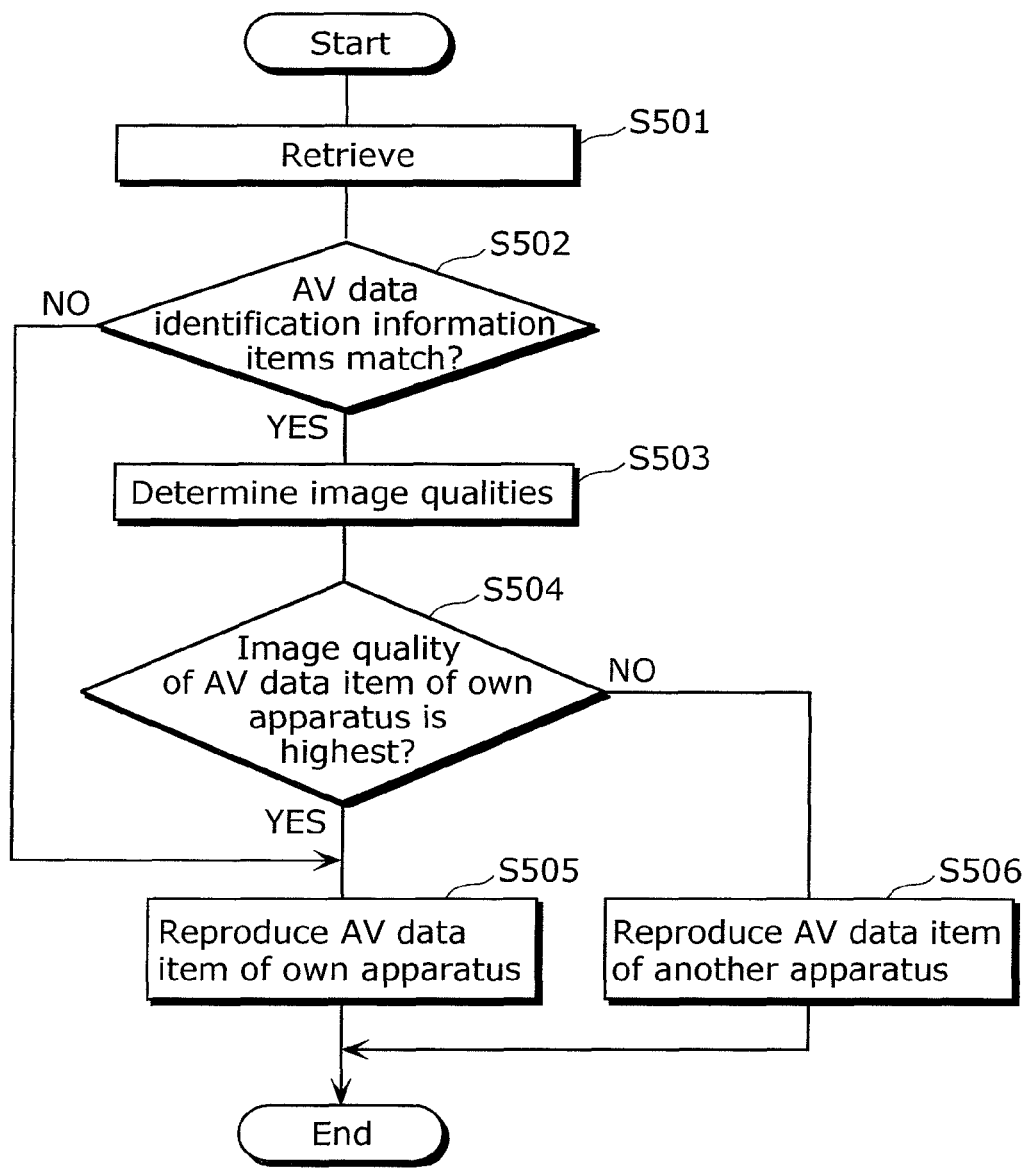
FIG. 9 is a flowchart illustrating the processes of retrieving, selecting, and reproducing the AV data item according to Embodiment FIG. 10 conceptually illustrates that each of the conventional recording and reproducing apparatuses transmits and receives an AV data item and information on a permitted number of copies held by the apparatus.
Figure 10:
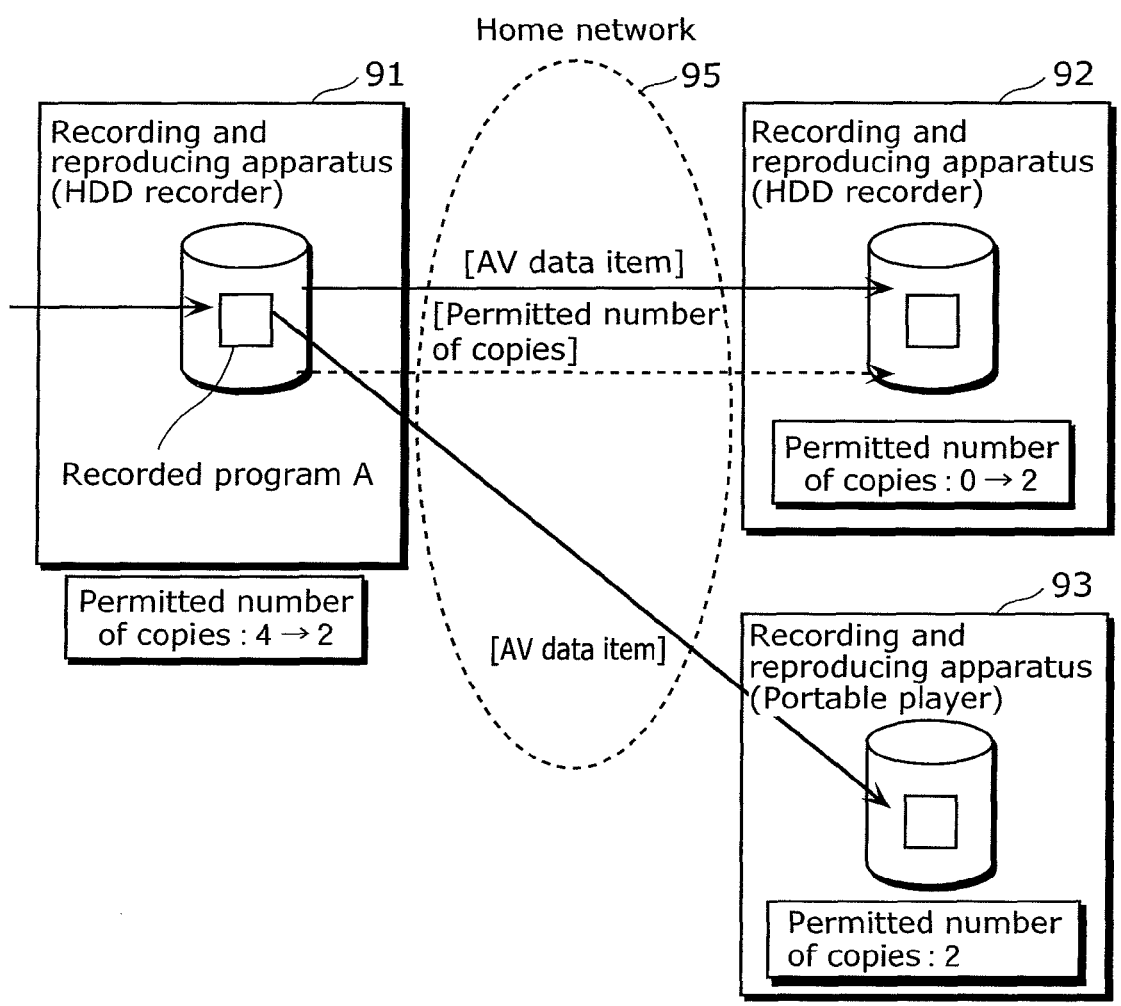

FIG. 9 is a flowchart illustrating the processes of retrieving, selecting, and reproducing the AV data item by the recording and reproducing apparatus 72 according to Embodiment 2 in the present invention.

When the user instructs the reproduction of an AV data item of the program B that is recorded in the own apparatus (the recording and reproducing apparatus 72), the retrieval control unit 28 of the recording and reproducing apparatus 72 retrieves items with reference to the apparatus/medium identification information 12 of the AV data item of the program A that is registered in the attribute information management table 15 (see FIG. 3) managed by the attribute information managing unit 27 (S501).

More specifically, the retrieval control unit 28 receives (i) the attribute information management table 15 including the attribute information item regarding the AV data item of the program B that is recorded in the own apparatus, and (ii) other attribute information management tables 15 each including the attribute information item of the program B, from the recording and reproducing apparatuses 71 and 73 via the home network 75.

Furthermore, the retrieval control unit 28 of the recording and reproducing apparatus 72 verifies whether or not the AV data identification information item 11 of the program B that is recorded in the own apparatus matches the AV data identification information item 11 indicated in a corresponding one of the received attribute information management tables 15, with reference to the attribute information management tables 15 (S502).

When these AV data identification information items 11 do not match each other as a result of the verification (No at S502), the reproducing unit 31 reproduces the AV data item of the program B that is recorded in the own apparatus (S505).

Furthermore, when these AV data identification information items 11 match each other (Yes at S502), the image quality comparing unit 29 determines the image qualities of the AV data items of the program B with reference to the image quality information items 14 in the received attribute information management table 15 (S503). The image quality comparing unit 29 determines whether or not the image quality of the AV data item of the program B that is recorded in the own apparatus is the highest from a result of the image quality determination (S504).

When the image quality comparing unit 29 determines that the image quality of the AV data item of the program B that is recorded in the own apparatus (recording and reproducing apparatus 72) is the highest (Yes at S504), the reproducing unit 31 obtains the AV data item of the program B in the own apparatus from the HDD 26 or the memory card 4, and reproduces the AV data item (S505).

Furthermore, when the image quality comparing unit 29 determines that the image quality of the AV data item of the program B that is recorded in the other apparatus (recording and reproducing apparatus 71 or 73) is the highest (No at S504), for example, the retrieval control unit 28 transmits, via the home network 75, an output request of the AV data item of the program B to the other apparatus having the AV data item of the program B whose image quality is the highest.

The reproducing unit 31 obtains the AV data item of the program B transmitted in response to the output request, for example, via the home network 75 and the transmitting and receiving unit 21. The reproducing unit 31 reproduces the obtained AV data item (S506).

As described above, the recording and reproducing apparatus 72 according to Embodiment 2 in the present invention selects the AV data item of the program B with the highest image quality, based on the result of the comparison on the retrieved image qualities of the retrieved AV data items of the program B, and reproduces the selected AV data item. Thus, even when copies of the AV data item of the program B are separately recorded in apparatuses, the AV data item with the highest image quality from among the AV data items of the program B can be effectively used.

Embodiment 2 in the present invention describes the example that the recording and reproducing apparatus 72 selects the AV data item from among the retrieved AV data items of the program B base on the image quality information items, and reproduces the selected AV data item. However, the recording and reproducing apparatus 72 may copy or move, to another recording and reproducing apparatus and others, the AV data item selected from among the retrieved AV data items of the program B base on the image quality information items.

Furthermore, although Embodiment 2 in the present invention describes the HDD 26 and the memory card 4 as recording media for recording information, such as an AV data item, for example, the recording media are not limited to these. For example, an optical disk drive may be used as a recording medium.

[Industrial Applicability]

The present invention is useful as a recording and reproducing apparatus and a recording and reproducing system that copies an AV data item to an other recording and reproducing apparatus via a network and shares the AV data item with the other recording and reproducing apparatus.

[Reference Signs List]
1, 2, 3, 71, 72, 73 Recording and reproducing apparatus
4 Memory card
5, 75 Home network
10 Copy information management table
11 AV data identification information item
12 Apparatus/medium identification information item
13 Permitted number of copies
14 Image quality information item
15 Attribute information management table
21 Transmitting and receiving unit
22 Encryption and decryption processing unit
23 Key exchange processing unit
24 Authentication processing unit
25 Transmission control unit
26 HDD
27 Attribute information managing unit
28 Retrieval control unit
29 Image quality comparing unit
30 Restriction value control unit
31 Reproducing unit

The invention claimed is:

1. A recording and reproducing apparatus that records and reproduces an Audio and Visual (AV) data item with a use restriction value defined by a predetermined copyright protection protocol, the AV data item including at least one of video data and audio data that are included in a program, said apparatus comprising:

an AV recording medium on which the AV data item is recorded;
a transmitting and receiving unit configured to transmit and receive the AV data item and information on the AV data item to and from an other apparatus connected to said recording and reproducing apparatus via a network;

a retrieving unit configured to retrieve a plurality of AV data items that indicate a same program and are recorded on said AV recording medium and in the other apparatus;

a comparing unit configured to compare image qualities of the AV data items retrieved by said retrieving unit; and a restriction value control unit configured to move use restriction values through said transmitting and receiving unit so that, based on a result of the comparison performed by said comparing unit, (i) a use restriction value of one of the AV data items that has a lower image quality is decreased by a predetermined value and (ii) a use restriction value of an other one of the AV data items that has a higher image quality is increased by the predetermined value.

2. The recording and reproducing apparatus according to claim 1, further comprising:

an attribute information recording medium on which the use restriction value of the AV data item recorded on said AV recording medium is recorded; and a managing unit configured to manage the use restriction value recorded on said attribute information recording medium, wherein said restriction value control unit is configured to move the use restriction values by controlling said managing unit and requesting the other apparatus so that (i) the use restriction value of one of the AV data items that has the lower image quality is decreased by the predetermined value and (ii) the use restriction value of the other one of the AV data items that has the higher image quality is increased by the predetermined value, the AV data items indicating the same program and including the AV data items recorded on said AV recording medium and in the other apparatus.

3. The recording and reproducing apparatus according to claim 2, wherein a permitted number of copies of the AV data item recorded on said AV recording medium is recorded on said attribute information recording medium as the use restriction value, and said restriction value control unit is configured to request the other apparatus to subtract the predetermined value from a permitted number of copies of an AV data item recorded in the other apparatus that is one of the AV data items retrieved by said retrieving unit and to cause said managing unit to add the predetermined value to the permitted number of copies recorded on said attribute information recording medium, when the comparison by said comparing unit shows that an image quality of the AV data item recorded in the other apparatus is lower than an image quality of the AV data item recorded on said AV recording medium.

4. The recording and reproducing apparatus according to claim 2, wherein a permitted number of copies of the AV data item recorded on said AV recording medium is recorded on said attribute information recording medium as the use restriction value, and said restriction value control unit is configured to cause said managing unit to subtract the predetermined value from the permitted number of copies recorded on said attribute information recording medium and to request the other apparatus to add the predetermined value to a permitted number of copies of an AV data item recorded in the other apparatus that is one of the AV data items retrieved by said retrieving unit, when the comparison by said comparing unit shows that an image quality of the AV data item recorded in the other apparatus is higher than an image quality of the AV data item recorded on said AV recording medium.

5. The recording and reproducing apparatus according to claim 1, wherein said recording and reproducing apparatus is connectable, via the network, to a plurality of apparatuses including the other apparatus, said recording and reproducing apparatus further comprises:

an attribute information recording medium on which the use restriction value of the AV data item recorded on said AV recording medium is recorded; and a managing unit configured to manage the use restriction value recorded on said attribute information recording medium, said retrieving unit is configured to retrieve the AV data items that indicate the same program, from among AV data items recorded in each of the apparatuses, said comparing unit is configured to compare the image qualities of the AV data items retrieved by said retrieving unit to identify an AV data item with a highest image quality from among the AV data items, and said restriction value control unit is configured to cause said managing unit to subtract the predetermined value from the use restriction value recorded on said attribute information recording medium and to request one of the apparatuses to add the predetermined value to a use restriction value of the AV data item with the highest image quality, the one of the apparatuses holding the AV data item with the highest image quality identified by said comparing unit.

6. The recording and reproducing apparatus according to claim 1, further comprising a reproducing unit configured to obtain and reproduce one of the AV data items determined as having a highest image quality, as a result of the comparison performed by said comparing unit.

7. The recording and reproducing apparatus according to claim 1, wherein said recording and reproducing apparatus is connectable, via the network, to a plurality of apparatuses including the other apparatus, and said recording and reproducing apparatus further comprises:

an attribute information recording medium on which an attribute value table is recorded, the attribute value table including an identification information item of one of the apparatuses on which an AV data item is recorded, and the AV data item being either a copy or a copy source of the AV data item recorded on said AV recording medium; and a transmission control unit configured, when said transmitting and receiving unit transmits the AV data item recorded on said AV recording medium, to read the identification information item from said attribute information recording medium and to cause said transmitting and receiving unit to transmit the identification information item to an other one of the apparatuses that is a destination of the AV data item.

8. The recording and reproducing apparatus according to claim 1, further comprising:

an attribute information recording medium on which an attribute value table is recorded, the attribute value table including (i) information indicating an image quality of the AV data item recorded on said AV recording medium and (ii) information indicating an image quality of an AV data item that is recorded in the other apparatus and is a copy of the AV data item recorded on said AV recording medium; and a managing unit configured to manage the attribute value table recorded on said attribute information recording medium, and to update the attribute value table using the information indicating the image quality of the AV data item that is recorded in the other apparatus, the information being received by said transmitting and receiving unit from the other apparatus, wherein said comparing unit is configured to compare the image quality of the AV data item recorded on said AV recording medium with the image quality of the AV data item recorded in the other apparatus with reference to the attribute value table recorded on said attribute information recording medium.

9. A recording and reproducing system including a plurality of recording and reproducing apparatuses connected to each other via a network, wherein at least one of the recording and reproducing apparatuses includes:

an AV recording medium on which an Audio and Visual (AV) data with a use restriction value defined by a predetermined copyright protection protocol is recorded, the AV data including at least one of video data and audio data that are included in a program;

a transmitting and receiving unit configured to transmit and receive the AV data item and information on the AV data item to and from an other apparatus connected to said recording and reproducing apparatus via a network;

a retrieving unit configured to retrieve a plurality of AV data items that indicate a same program and are recorded on said AV recording medium and in the other apparatus;

a comparing unit configured to compare image qualities of the AV data items retrieved by said retrieving unit; and a restriction value control unit configured to move use restriction values through said transmitting and receiving unit so that, based on a result of the comparison performed by said comparing unit, (i) a use restriction value of one of the AV data items that has a lower image quality is decreased by a predetermined value and (ii) a use restriction value of an other one of the AV data items that has a higher image quality is increased by the predetermined value.

10. A use restriction value control method executed by a recording and reproducing apparatus that records and reproduces an Audio and Visual (AV) data item with a use restriction value defined by a predetermined copyright protection protocol, the AV data item including at least one of video data and audio data that are included in a program, said method comprising:

retrieving a plurality of AV data items that indicate a same program and are recorded on an AV recording medium included in the recording and reproducing apparatus and recorded in an other apparatus connected to the recording and reproducing apparatus via a network;

comparing image qualities of the AV data items retrieved in said retrieving; and moving use restriction values so that, based on a result of the comparison performed in said comparing, (i) a use restriction value of one of the AV data items that has a lower image quality is decreased by a predetermined value and (ii) a use restriction value of an other one of the AV data items that has a higher image quality is increased by the predetermined value.

11. A non-transitory computer readable medium storing a program for controlling a recording and reproducing apparatus that records and reproduces an Audio and Visual (AV) data item with a use restriction value defined by a predetermined copyright protection protocol, the AV data item including at least one of video data and audio data that are included in a program, said program causing a computer to execute:

retrieving a plurality of AV data items that indicate a same program and are recorded on an AV recording medium included in the recording and reproducing apparatus and recorded in an other apparatus connected to the recording and reproducing apparatus via a network;

comparing image qualities of the AV data items retrieved in said retrieving; and moving use restriction values so that, based on a result of the comparison performed in said comparing, (i) a use restriction value of one of the AV data items that has a lower image quality is decreased by a predetermined value and (ii) a use restriction value of an other one of the AV data items that has a higher image quality is increased by the predetermined value.

* * * * *